Jan. 7, 1969

D. W. SAWYER 3,419,945

EMBALMING MACHINE

Filed May 16, 1966

INVENTOR.
DONALD W. SAWYER
BY
Julian Caplan
ATTORNEY

United States Patent Office 3,419,945
Patented Jan. 7, 1969

3,419,945
EMBALMING MACHINE
Donald W. Sawyer, % Sawyer Enterprises, 21125 Aspen
Ave., Castro Valley, Calif. 94546
Filed May 16, 1966, Ser. No. 550,405
U.S. Cl. 27—24    4 Claims
Int. Cl. A61m 1/00

ABSTRACT OF THE DISCLOSURE

An embalming machine has an embalming fluid reservoir from which a pump draws liquid to a valve block wherein are incorporated a flow valve regulating volume and a pressure valve regulating pressure. Fluid discharge from the block to a tube leading to the injection needle is controlled by a solenoid valve. A timer motor turns a plurality of cams, each having different numbers of dwells and each actuating a switch. A selector switch connects into the circuit of the solenoid any cam switch, thus selecting the desired number of fluid pulsations per minute, choice depending upon the condition of the body being embalmed.

---

This invention relates to a new and improved embalming machine.

A principal object and advantage of the present invention is the reduction in time required to embalm a body as compared with other apparatus and methods. The reduction in time is accomplished by accurate and adjustable control of the pressure of injection of the embalming fluid and likewise by accurate adjustment and control of the rate of flow of the fluid. The result accomplished by use of the present invention is a reduction in embalming time to approximately one fifth that normally required. More specifically, the controls may be adjusted to accommodate the individual conditions of the body being embalmed, it being understood that the rapidity with which the process can be accomplished is dependent upon physical conditions of the particular case involved.

A still further feature of the invention is the fact that the fluid may be injected by pulsation and the frequency of pulsation may be controlled by the operator. Control of the rapidity of pulsation in this manner reduces the tendency toward distortion of the features which sometimes occur in other embalming machines and methods. Although the machine is intended for use at frequencies of 40, 50, 60, 70 or 80 pulsations per minute, nevertheless there is also provision made for direct injection without pulsation.

An advantage of the invention is the fact that it is seldom necessary for the operator to "raise" more than one artery in the body, yet the machine will push the embalming fluid to all of the distal portions.

Still another feature of the invention is its durability. The machine is designed for heavy duty usage. Its parts are corrosive resistant to embalming fluid, the metal parts being stainless steel or brass and the conduits being of a durable plastic tubing. The joints of the conduits are nonleaking, threaded fitting.

Other objects of the present invention will become apparent upon reading the following specification and referring to the accompanying drawings in which similar characters of reference represent corresponding parts in each of the several views.

Figure 1:
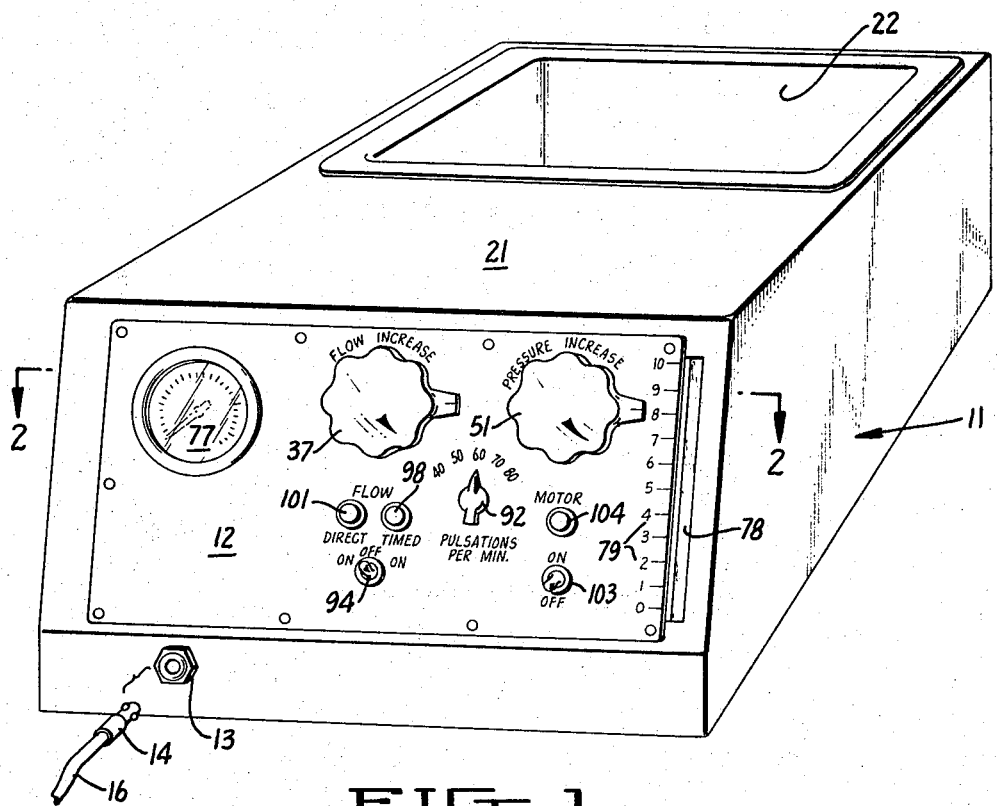
FIG. 1 is a perspective view of the machine.
Figure 2:
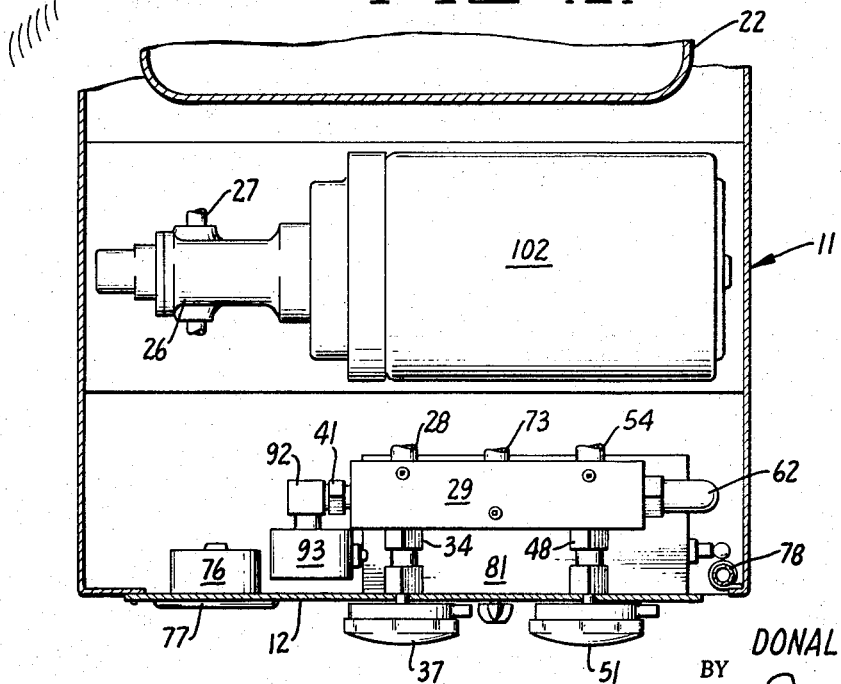
FIG. 2 is a fragmentary horizontal sectional view taken substantially along the line 2—2 of FIG. 1.
Figure 3:
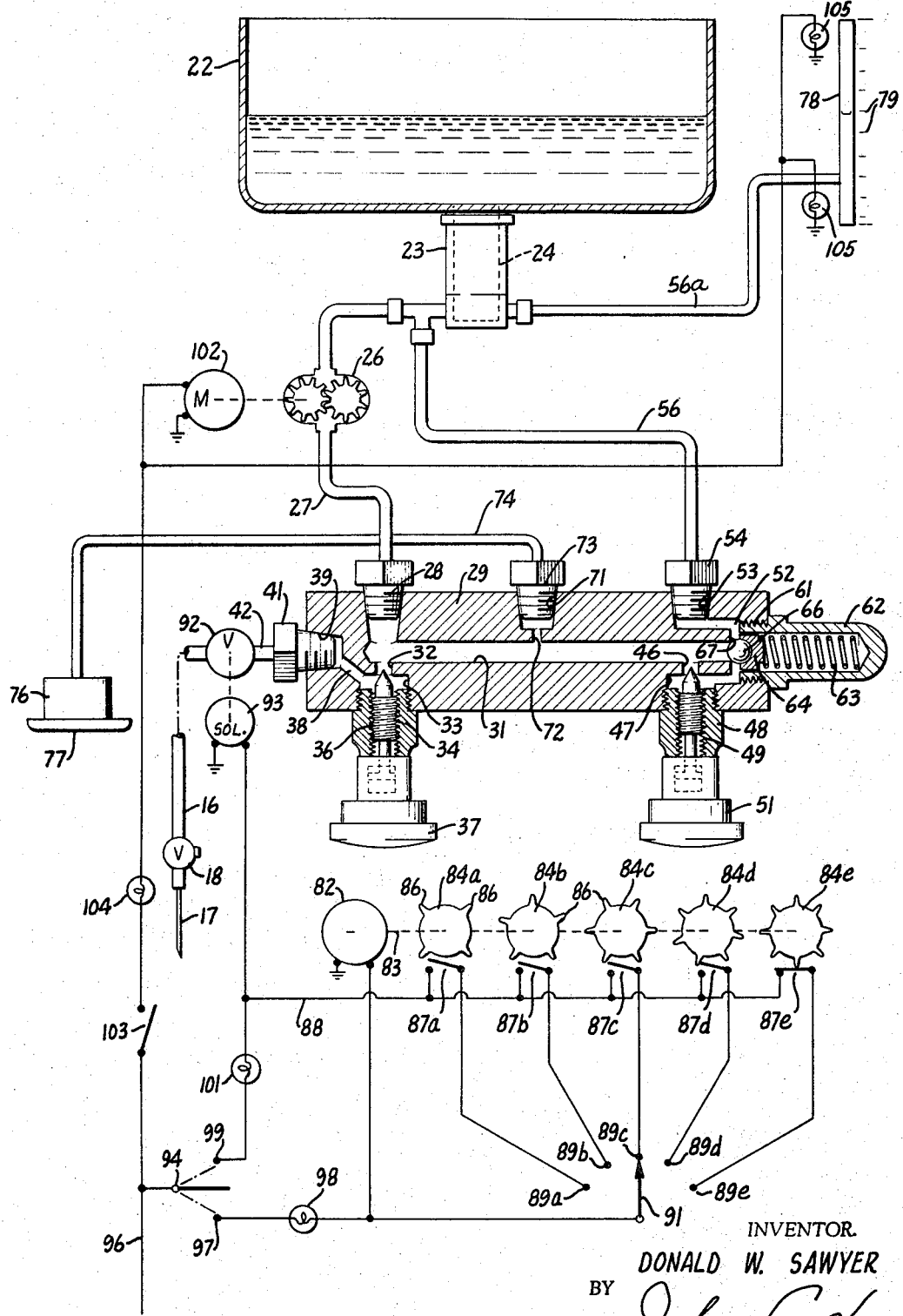
FIG. 3 is a schematic combined piping and wiring diagram.

The machine which is the subject of this invention is almost entirely enclosed within a casing 11 formed of a sheet metal such as stainless steel and generally rectangular in plan. At the front end is a control panel 12 and below panel 12 is a fitting 13 for insertion of the cooperating fitting 14 of an elongated hose 16 which terminates in a needle 17 having a needle control valve 18 adjacent thereto. Recessed in the rear of top 21 is a basin 22 which is rectangular in shape having at its bottom a sump 23 provided with a strainer 24 to prevent waste material which may fall into the basin 22 from entering the system. Basin 22 is initially filled with an embalming fluid of a type commercially available.

A corrosion resistant gear pump 26 is installed in conduit 27 which leads from sump 23 to fitting 28 inserted in a pipe tap in valve block 29. Block 29 has an elongated valve chamber 31 with which fitting 28 communicates.

At one end of chamber 31 is a port 32 leading to a taped bore 33 in which is installed an internally threaded fitting 34 receiving threaded needle 36 manually controlled by knob 37 on panel 12. A duct 38 leads from bore 33 to tapped hole 39 in which is installed fitting 41 connected to conduit 42 and thus the normal flow from pump 26 into chamber 31 is through ports 32, 38 and thence conduit 42, the rate of flow being controlled by needle 36 through manual adjustment of knob 37.

At the end of block 29 opposite port 32 is a further port 46 which leads to bore 47 in which is installed fitting 48 which is internally threaded to receive threaded needle 49 controlled by knob 51 on panel 12. An annular passage 52 communicates between bore 47 and tapped hole 53 in block 29. Hole 53 receives fitting 54 which is connected to tube 56 leading back to sump 24. Adjustment of needle 49 through knob 51 controls the maximum pressure within chamber 31 and also in conduit 42, in that the fluid will by-pass back to basin 22 through port 46 when the pressure tends to become excessive. As a safety precaution, a tapped hole 61 is formed in the end of block 29 opposite hole 39. Hollow fitting 62 is threaded into hole 61. Within fitting 62 is a spring 63 which bears against holder 64 which receives a ball normally seating against and closing the open end 67 of chamber 31. However, when the pressure in chamber 31 exceeds a predetermined amount, spring 63 yields permitting ball 66 to open the end 67 of chamber 31 to passage 52 and thence back to basin 22.

Tapped hole 71 in block 29 communicates with chamber 31 through a reduced diameter hole 72. Fitting 73 is threaded into hole 71 and is connected to conduit 74 which leads to a commercially available gauge 76, the dial 77 of which is visible in panel 12. Gauge 76 is preferably provided with a diaphragm which seals the working mechanism of the gauge from the embalming fluid, there being a glycerin or other liquid on the side of the diaphragm opposite fitting 73 which further functions as a pulsation dampener so that the gauge gives a more stable reading despite pulsations which occur as hereinafter explained.

To determine the quantity of liquid in basin 62 a gauge glass 78 is installed along control panel 12 suitably calibrated by markings 79. Glass 78 communicates through conduit 56a with the sump 24 and thus shows the level of liquid therein.

Mounted immediately below valve block 29 is a timer casing 81 which has a timer motor 82 provided with a shaft 83 on which are a plurality of cams 84a to 84e, inclusive. Cam 84a has four dwells 86 and each of the cams in order has one additional dwell. Assuming that motor 82 revolves at 10 revolutions per minute, the selection of cams 84a to 84e will provide pulsations from 40 to 80 pulsations per minute as hereinafter explained.

Associated with each of the cams 84a to 84e is an individual microswitch 87a to 87e, respectively. One terminal of each such switch is connected to a common wire 88. The other terminal of each such switch is connected by an individual wire to selector switch terminal 89a to 89e, respectively, which can be individually selected by selector switch contact 91 under the control of knob 92 on the control panel 12.

Installed in conduit 42 is a valve 92 which discharges to conduit 16 and is controlled by a solenoid 93. Double throw switch 94 on panel 12 is connected to current source 96. One terminal 97 of switch 94 is connected to selector switch 91 and also to timer motor 82 with a pilot light 98 installed therein and visible on panel 12. When switch 94 is connected to contact 97 and selector switch 91 is connected to the appropriate contact 89a to 89e, solenoid 93 is energized the appropriate number of pulsations per minute to open valve 92 at the desired frequency. On the other hand, when direct injection is preferred, switch 94 is turned to contact 99 which leads directly to solenoid 93 with pilot light 101 installed therein and solenoid 93 is continuously energized leaving valve 92 continuously open. Switch 94 also has an intermediate or off position which closes valve 92.

Pump 26 is continuously driven by motor 102, the motor 102 being controlled by motor switch 103 on panel 12 with pilot light 104 likewise installed thereon. Lights 105 illuminating gauge glass 78 are likewise controlled by switch 103.

In use, basin 22 is filled with the desired quantity of embalming fluid, the level of the fluid being observed through gauge 78. Switch 103 is closed starting motor 102. An artery of the body is raised and needle 17 inserted therein and needle valve 18 adjusted. Based upon experience, the operator determines whether pulsating or direct injection is preferred and moves switch 94 accordingly. The rate of flow pressure and frequency of pulsations are also determined by experience and knobs 37, 51 and 92 initially adjusted acocrdingly. However, as the operation continues, the operator can by inspection determine whether adjustments should be made in these three respects and such adjustments may be readily achieved while the operation continues without stopping the flow of fluid. Timer motor 82 turns continuously during the pulsation phase of the operation and depending upon which of the contacts 89a to 89e has been chosen, the microswitches 87a to 87e close at the desired frequency. Such frequency determines the opening of valve 92 under the control of solenoid 93.

Adjustment of knob 37 controls the position of needle 36 in needle valve port 37 and thus determines the rate of flow. Similarly, adjustment of knob 51 controls position of needle 49 in port 86 and thus adjusts the pressure in chamber 31 since when the pressure is exceeded the fluid by-passes back through conduits 56 and 57a to basin 22. Ball 66 lifts as a safety precaution when the pressure exceeds the force of spring 63.

When direct injection is preferred, switch 94 is turned to contact 99 and solenoid 93 holds valve 92 continuously open.

As the operation continues, the operator makes the necessary adjustment to insure that the embalming operation is conducted as rapidly as is commensurate with performance of a satisfactory result. In other words, the flow, pressure and pulsations must be adjusted so that fluid is forced to the distal extremity. Distortion of the physical features of the body is avoided by not exceeding safe rates of flow pressure and pulsation. Nevertheless, the operator by experience can employ the machine to materially reduce the time of embalming over conventional apparatus and methods.

Although the foregoing invention has been described in some detail, by way of illustration and example for purposes of clarity of understanding, it is understood that certain changes and modifications may be practiced within the spirit of the invention and scope of the appended claims.

What is claimed is:

1. An embalming machine comprising a reservoir for embalming fluid, a rotary, positive pressure, continuously operating pump connected to said reservoir, a valve block connected to receive the discharge of said pump, an elongated tube connected to receive the discharge of said valve block, a needle on the distal of said tube, and manually adjusted flow valve means in said valve block regulating flow of fluid from said block to said tube, a second valve in said tube, a solenoid controlling said second valve, timing means timing energization of said solenoid, manually selected means for varying said timing means, said timing means comprising a motor, a plurality of cams driven by said motor having varying numbers of dwells, a plurality of switches each associated with a cam and closed by the dwells of said cams, and electric means connecting each said switch with said solenoid and in which said selected means comprises a selector switch selectively connecting each said first mentioned switches with a source of electric current.

2. A machine according to claim 1, which further comprises a return conduit from said block to said reservoir and manually adjustable pressure valve means in said block regulating flow into said return conduit to maintain pressure in said block below a selected pressure.

3. A machine according to claim 2, which further comprises a spring-biased pressure relief valve in said block independent of said pressure valve means opening to provide an additional path of return through said return conduit.

4. A machine according to claim 1, which further comprises circuit means by-passing said switches and selector switch to energize said solenoid to continuously open said second valve.

References Cited

UNITED STATES PATENTS

| 1,829,144 | 10/1931 | Kaiser | 27—24 X |
| 2,388,337 | 11/1945 | Moody | 27—24 X |
| 2,626,446 | 1/1953 | Moore | 27—24 |
| 2,830,578 | 4/1958 | De Groff. | |

RICHARD A. GAUDET, *Primary Examiner.*

WILLIAM E. KAMM, *Assistant Examiner.*